US007720555B2

(12) United States Patent  
Staiger (10) Patent No.: US 7,720,555 B2
(45) Date of Patent: May 18, 2010

(54) HEATING DEVICE FOR A FIELD DEVICE DISPLAY (75) Inventor: Holger Staiger, Lauterbach (DE)

(73) Assignee: Vega Grieshaber KG, Wolfach (DE)

( * ) Notice: Subject to any disclaimer, the term of this patent is extended or adjusted under 35 U.S.C. 154(b) by 421 days.

(21) Appl. No.: 11/614,552

(22) Filed: Dec. 21, 2006

(65) Prior Publication Data

US 2007/0191974 A1    Aug. 16, 2007

Related U.S. Application Data (60) Provisional application No. 60/757,557, filed on Dec. 27, 2005.

(30) Foreign Application Priority Data

Dec. 27, 2005  (DE) ............... 10 2005 062 421

(51) Int. Cl.
*G05B 9/02* (2006.01)
*G05B 15/00* (2006.01)
*B25F 1/00* (2006.01)
*B25B 7/00* (2006.01)
*B25B 7/02* (2006.01)
*H05B 6/68* (2006.01)
*H05B 6/10* (2006.01)
*H05B 6/06* (2006.01)
*H05B 6/74* (2006.01)
*H05B 1/02* (2006.01)
*A21B 1/00* (2006.01)
*G01P 15/00* (2006.01)
*G01F 23/00* (2006.01)
*G01D 11/24* (2006.01)

(52) U.S. Cl. ............... 700/83; 219/414; 219/506; 219/625; 219/663; 219/720; 219/722; 219/745; 81/2; 81/300; 81/418; 73/12.13; 73/290 R; 73/431; 700/79

(58) Field of Classification Search ............... 700/83, 700/79; 81/2, 300, 418; 219/720, 625, 663, 219/414, 722, 745, 506; 73/12.13, 290 R, 73/431
See application file for complete search history.

(56) References Cited

U.S. PATENT DOCUMENTS 3,736,404 A  *  5/1973  Eisler .................. 219/203

(Continued)

FOREIGN PATENT DOCUMENTS

DE          44 17 990       11/1995

(Continued)

OTHER PUBLICATIONS

Sakasegawa et al., "Two-wire Remote Lighting Control System with Multichannel and Group Dimmer Functions", 1999, MEW Technical Report. p. 49-55.*

*Primary Examiner*—Ramesh B Patel
*Assistant Examiner*—Thomas H Stevens
(74) *Attorney, Agent, or Firm*—Fay Kaplun & Marcin, LLP (57) ABSTRACT A heating device for a field-device display module includes a heating element. The heating element is adapted to the shape of the field-device display module and is equipped such that it converts an electrical current to thermal energy. The heating element can be coupled to the field-device display module such that by the heating element the field-device display module can be heated.

20 Claims, 4 Drawing Sheets

U.S. PATENT DOCUMENTS

| | | |
|---|---|---|
| 4,853,694 A | 8/1989 | Tomecek |
| 4,952,783 A | 8/1990 | Aufderheide et al. |
| 5,558,115 A * | 9/1996 | Lenz et al. .................... 137/86 |
| 5,573,032 A * | 11/1996 | Lenz et al. .................. 137/486 |
| 5,920,366 A * | 7/1999 | Dehmlow et al. ........... 349/161 |
| 6,143,418 A * | 11/2000 | Takamiya et al. ........... 428/434 |
| 6,163,359 A | 12/2000 | Smith et al. |
| 6,446,202 B1 * | 9/2002 | Krivoshein et al. .............. 713/1 |
| 6,730,917 B2 * | 5/2004 | Baggett et al. ......... 250/453.11 |
| 6,919,939 B2 | 7/2005 | Lude |
| 7,010,366 B2 | 3/2006 | Konrad et al. |
| 7,035,773 B2 * | 4/2006 | Keyes et al. ................ 702/188 |
| 7,103,426 B2 * | 9/2006 | Keyes ........................ 700/79 |
| 2002/0079304 A1 | 6/2002 | Brandt et al. |

FOREIGN PATENT DOCUMENTS

| | | |
|---|---|---|
| DE | 197 00 807 | 7/1997 |
| DE | 10 048 804 | 4/2002 |
| DE | 100 31 251 | 12/2002 |
| DE | 101 29 220 | 12/2002 |
| DE | 20 122 094 | 5/2004 |
| EP | 0 370 627 | 5/1990 |
| EP | 10 39 332 | 9/2000 |
| GB | 2309573 | 7/1997 |

* cited by examiner

HEATING DEVICE FOR A FIELD DEVICE DISPLAY

RELATED APPLICATIONS

This application claims the benefit of the filing date of U.S. Provisional Patent Application Ser. No. 60/757,557 filed Dec. 27, 2005 and of German Patent Application Serial No. DE 10 2005 062 421.9, filed Dec. 27, 2005, the disclosures of which are hereby incorporated herein by reference.

FIELD OF THE INVENTION

The present invention relates to a heating device. In particular, the present invention relates to a heating device for a field-device display module, to a heating arrangement for a field-device display module, to a measuring device comprising a heating arrangement, and to a method for reading off a measured value from a field-device display module.

TECHNOLOGICAL BACKGROUND

During industrial production processes solids or liquids are converted in order to produce a new end product from an input product. In the chemical industry, for example, the production process may require that the input product for the production of the end product occurs in different states of aggregation.

For example, containers are alternately filled with fillings or materials are heated and reprocessed at a particular temperature. In order to be able to monitor the production process, an information about the actually prevailing state of the respective product should be available which information is as accurate as possible.

For the accurate registering of the states, in particular of fill levels or pressures in containers, measuring devices are thus employed at many positions in the production process, which can determine physical characteristics of the material.

The results of the measurements are converted for the presentation in a form that can be interpreted by a user. For the presentation of measured values, displays are used, from which a user can read off a measured result.

The reading off of the displays can depend on the external environment, and due to environmental influences the reading can be impaired such that the reading off is no longer possible.

SUMMARY OF THE INVENTION

According to an exemplary embodiment of the present invention a heating device for a field-device display module, a heating arrangement for a field-device display module, a measuring device comprising a heating arrangement, and a method for reading off of a measured value from a field-device display module is created.

According to an exemplary embodiment of the present invention, a heating device for a field-device display module is stated, wherein the heating device comprises a heating element, and wherein the heating element is adapted to the shape of the field-device display module. The heating device is adapted to convert an electrical current to thermal energy, and the heating element can be coupled to the field-device display module such that by the heating element the field-device display module can be heated.

Thus a reliable readable display may be provided.

According to a further exemplary embodiment of the present invention, a heating arrangement for a field-device display module is created, wherein the heating arrangement comprises a heating device and a heating-element control device, wherein the heating-element control device is equipped such that a current for the heating element is controlled such that a pre-definable thermal energy can be fed to the field-device display module.

According to yet another exemplary embodiment of the present invention, a measuring device comprising a heating arrangement with the above-mentioned features is provided.

According to a further exemplary embodiment of the present invention, a method for displaying a measured value on a field-device display module is stated. Accordingly, the heating arrangement is switched on and the field-device display module is heated. The displaying of the measured value takes place after the heating.

By a heating device according to the invention it may be possible to enhance the read off reliability of a field device display. In particular, it may be possible to prevent the field device display or field-device display module from freezing, which may be one reason for poorly readable indications of measured values on a field device display, a field-device display module, an indicator or a display.

The prevention of freezing may in particular make it possible to read off an LCD display. Displays may be designed as LCD displays, which are based on liquid-crystal displays. An LC display or LCD display (=liquid crystal display) may be a monitor in which liquid crystals are used, which crystals may influence the polarising direction of light in order to be able to deflect light in particular angles. By point by point driving of the liquid crystals a pixel may be made visible at the selected position. From many of these pixels, the numeric value of a measured value for example may be displayed.

An LCD display may comprise a layer comprising liquid crystals. In order to influence the deflection angle, the crystals in the liquid may be moved. The lower an external temperature and the lower consequently the temperature of the liquid-crystal-filled layer, the more inert any movement of the crystals in the layer may be. In the case of too low temperatures the liquid crystal layer may freeze such intensely that it may be no longer possible to display any values because, substantially, movement of the crystals may be no longer possible.

A field device display, in particular a field-device display module, may use an LCD display for the indication, in particular for the indication of a measured value. In order to prevent the field-device display from freezing at low temperatures, the field device may comprise a heating element that supplies a thermal energy to the field-device display module, which thermal energy may be adequate to keep the operating temperature of the display such high that the display still is able to operate and that despite low ambient temperatures a meter reading is possible.

If the shape of the heating element is adapted to the shape of the field-device display module the heating element may be coupled to the field-device display module with precise fit and the heating element may be coupled to the field-device display module tightly fitting. By the tight contact of the field-device display module and the heating element, thermal losses during a heat transfer from the heating element to the field-device display module may be prevented.

The extent of the thermal energy that the heating element may release may be specified by a control device. Therewith, for example, it may be influenced and/or specified how quickly the temperature of the field device display changes. It may be possible to set the extent of the released thermal energy by the extent of an electrical current through the heating element. The extent of the electrical current value may be more easily influencable by an electric circuit rather than the heat quantity directly.

The field of application of a field device which field device comprises a field device display with a heating arrangement may be expanded in comparison to a field device without a heating arrangement, or a field device without a heating element. A measured value determined by a field device and a measured value displayed by a field device may also be carried out or displayed in locations in which low temperatures predominate. For example, fill levels of containers in cold storage facilities or in colder regions of the world may be read off.

Often it may be sufficient to heat the field device display only for the duration of the reading off. By providing an on/off switch it may be possible to heat the display for the reading off duration.

By a modular construction of the heating arrangement, the heating arrangement may extend an existing measuring device, field device or sensor, in particular its display.

Below, further exemplary embodiments of the present invention are described with regard to the heating device. These embodiments also apply to the heating arrangement, to a field-device display module, to the measuring device comprising a heating arrangement, and to the method for displaying a measured value.

According to a further exemplary embodiment of the present invention, a heating device is stated in which the heating element heats the field-device display module by thermal conduction.

The thermal conduction may be achieved by the contact, i.e. by the setting up of a contact of the heating element with the display. The direct connection, created by the contact between the heating element and the display may reduce losses.

According to another exemplary embodiment of the present invention, a heating device is stated in which the heating element heats the field-device display module by thermal radiation.

If an immediate attachment of the heating element to the field device display may not be possible, heating of the display may nevertheless occur by heating the display by thermal radiation. For example, it can happen that the display and the heating device are spaced apart.

According to yet another exemplary embodiment of the present invention, the heating element is designed as a heating foil.

A heating foil may heave a little thickness or a little height. Consequently, a heating foil may be coupled to the field-device display module in a space-saving way.

According to yet another exemplary embodiment of the present invention, the heating foil or the heating element comprises an adhesive side or an adhesive strip. An adhesive side can be a side of the heating foil, which side comprises an adhesive.

By the adhesive side, the heating foil may be glued to the field device display, in particular to a rear region, when seen in the direction of reading off the field device display, of the field device display.

Furthermore, according to a further exemplary embodiment of the present invention, a heating device with an illumination device is stated, wherein the illumination device can be coupled between the field-device display module and the heating device.

According to yet another exemplary embodiment of the present invention, a heating device is stated which comprises a substantially transparent heating element.

A transparent heating element may make it possible to couple the heating element in front of the heating element when viewed in a direction of reading off the display. Despite the presence of the heating element the display can be read off. A transparent heating element may, for example, be produced by placing a fine wire in a transparent layer or by vapour deposition of a transparent layer. Thereby the wire may be selected such fine that it is substantially invisible to the human eye. A transparent heating element may also be producible by a vapour depositioned glass or a wire in a glass.

Below, further exemplary embodiments of the present invention are described with regard to the heating arrangement. These embodiments also apply to the heating device for a field-device display module, to the measuring device comprising a heating arrangement, and to the method for displaying a measured value.

According to a further exemplary embodiment of the present invention, the heating arrangement comprises a first line system, by which the heating arrangement, in particular the heating element, is supplied with electrical current.

The energy for the heating of the display can be provided via the line system for the current supply.

According to yet another exemplary embodiment of the present invention, the first line system comprises an EMC filter (electromagnetic compatibility). The EMC filter may be arranged in front of the heating element when viewed in a direction for the power supply or current propagation.

The EMC filter can suppress interfering signals that are coupled in via the line system, and thus may protect the heating element and all the downstream electronic components against damage. An interfering electromagnetic radiation could, for example, be generated by an induction furnace. An existing EMC filter may allow the operation of the heating arrangement in the vicinity of an induction furnace or in the vicinity of other device that emits an electromagnetic radiation.

According to a further exemplary embodiment of the present invention the first line system for supplying current to the heating arrangement is decoupled from a second line system. The second line system is equipped for the provision of a measured value. Thus, a separate transmission of signals and of energy or power to the field device may take place.

Consequently, the heating arrangement may obtain the power required by the heating arrangement via a separate line system, whereby it may be ensured that sufficient power is available for the operation of the heating arrangement. The 4-wire HART® bus system may be a possible system in which a separation of the current supply and the signals may take place.

According to a further exemplary embodiment of the present invention, the first line system for supplying current is designed as a measuring-bus line system.

Since a single line system may be used for the power supply and for the transmission of measured values, lines to the field device may be saved.

According to a further exemplary embodiment of the present invention, the measuring-bus line system is a measuring-bus line system selected from the group consisting of a 2-wire HART® bus system, Profibus bus system and Fieldbus foundation bus system. These bus systems may make possible an integrated current supply via a signal line in which signal line the measuring signals and the energy are provided.

According to a further exemplary embodiment of the present invention, the heating arrangement comprises a temperature measuring device. Furthermore, the temperature measuring device is equipped to measure an ambient temperature. The heating-element control device is equipped such that from a predeterminable ambient temperature on a constant current can be supplied to the heating element.

Thereby the constant current may be suppliable from the drop below a specifiable temperature threshold. Thereby heating may start only from a predeterminable lower threshold temperature on. By the measuring of the ambient temperature it may be detectable when the danger of freezing of the field-device display module exists. Furthermore, it may be avoidable having to expend energy for the heating above the temperature threshold without having a need for the heating.

According to yet another exemplary embodiment of the present invention, the heating arrangement comprises a temperature measuring device. Furthermore, the temperature measuring device is equipped or adapted to measure an ambient temperature. The heating-element control device is equipped or adapted to control the current for the heating element such that a thermal energy can be supplied to the field-device display module via the heating element, depending on the measured ambient temperature.

Thereby more energy in the form of a current may be provided to the heating element when the ambient temperature drops. Conversely, the energy supply to the heating element can be reduced when the ambient temperature rises.

According to another exemplary embodiment of the present invention, the heating arrangement comprises a temperature measuring device, wherein the temperature measuring device can be coupled to the field-device display module or the field device display. By the direct coupling the temperature measuring device can measure the temperature of the field-device display module. The heating-element control device can be equipped to keep the temperature of the field-device display module constant.

The heating-element control device together with the temperature measuring device and the heating device may constitute a fed-back closed loop, i.e. a closed loop with a feedback, for the display temperature. In other words this means that with the temperature measuring device a current actual value of the display temperature may be determined. This actual value may be compared with a pre-set desired value and, depending on the deviation between the desired value and the actual value determined during this comparison, the heating element may be driven.

If the actual value is lower than the specified desired value, more thermal energy may be supplied to the display. Conversely, if the actual value is above the desired value, the thermal energy supply to the field-device display module may be reduced or switched off completely. Thus, the temperature of the display may be kept in a permissible range. Examples of permissible temperature ranges may be from −40° C. to +85° C., from −10° C. to +70° C., or from −40° C. to +80° C.

According to a further exemplary embodiment of the present invention, the heating arrangement comprises a field device housing, wherein the field device housing comprises a hollow space.

The heating-element control device is equipped such that the heating-element control device can be accommodated in the hollow space.

Since often several components may be arranged in a field-device housing interior or in a hollow space, there may be a shortage of space in the field device housing. Thus space for the measuring electronics may be required in a special electronics insert within the field device housing.

If the structural shape of the heating-element control device, which control device may be additionally accommodated in the hollow space, is adapted to a free space, the heating-element control device may more easily be accommodated in the field device housing. Moreover, the structural shape of the heating-element control device may be adapted to the electronics insert such that it may engage a structure on the electronics insert and may be attached to the electronics insert like a backpack.

According to a further exemplary embodiment of the present invention, the field-measuring device housing is at least in part made from aluminium, whereby the housing may serve as a ground shield, and interference radiation may be kept away from the interior of the housing.

According to yet another exemplary embodiment of the present invention, the heating-element control device is designed as a cast component.

For the design as a cast component an assembly for performing the functionality of a heating-element control device may be cast in a resin or plastic. The casting may provide the assembly with a specifiable external contour, and the casting may render the assembly robust against mechanical impacts.

According to a further exemplary embodiment of the present invention, the heating arrangement comprises an energy storage.

It may happen that the heating arrangement is not active without interruptions. It may also happen that more power is provided to the measuring device than is needed by the measuring device for the operation. Thus, for example, in the regulation of a 4 to 20 mA signal, an additional current may arise, which is not utilised by the measuring circuit for the measuring task.

An energy storage with a corresponding charge regulation or energy management may make it possible to store energy at a point in time at which excess energy is present, and to provide the stored energy at a subsequent point in time for the heating. Thereby the capacity of the energy storage may be adapted to the heating performance.

According to a further exemplary embodiment of the present invention, a fill-level measuring device and/or a pressure measuring device with a heating arrangement with the features described above is provided.

The invention may make it possible to prevent the display from freezing at low temperatures. Thereto, by a supply of heat, the display temperature may be increased. The increase of the temperature may take place during the entire operation of the measuring device. However, the display temperature may also be increased only during the time in which a reading off of the display should take place.

Thus, for example, a display that may be used down to −40° C. may be used at −65° C. if the display temperature is increased by 25° C.

SHORT DESCRIPTION OF THE DRAWINGS

Below, exemplary embodiments of the present invention are described with reference to the figures.

DETAILED DESCRIPTION OF EXEMPLARY EMBODIMENTS

The illustrations in the figures are schematic and not to scale. In the following description of the FIG. 1 to FIG. 11 the same reference characters are used for identical or similar elements.

Figure 1:
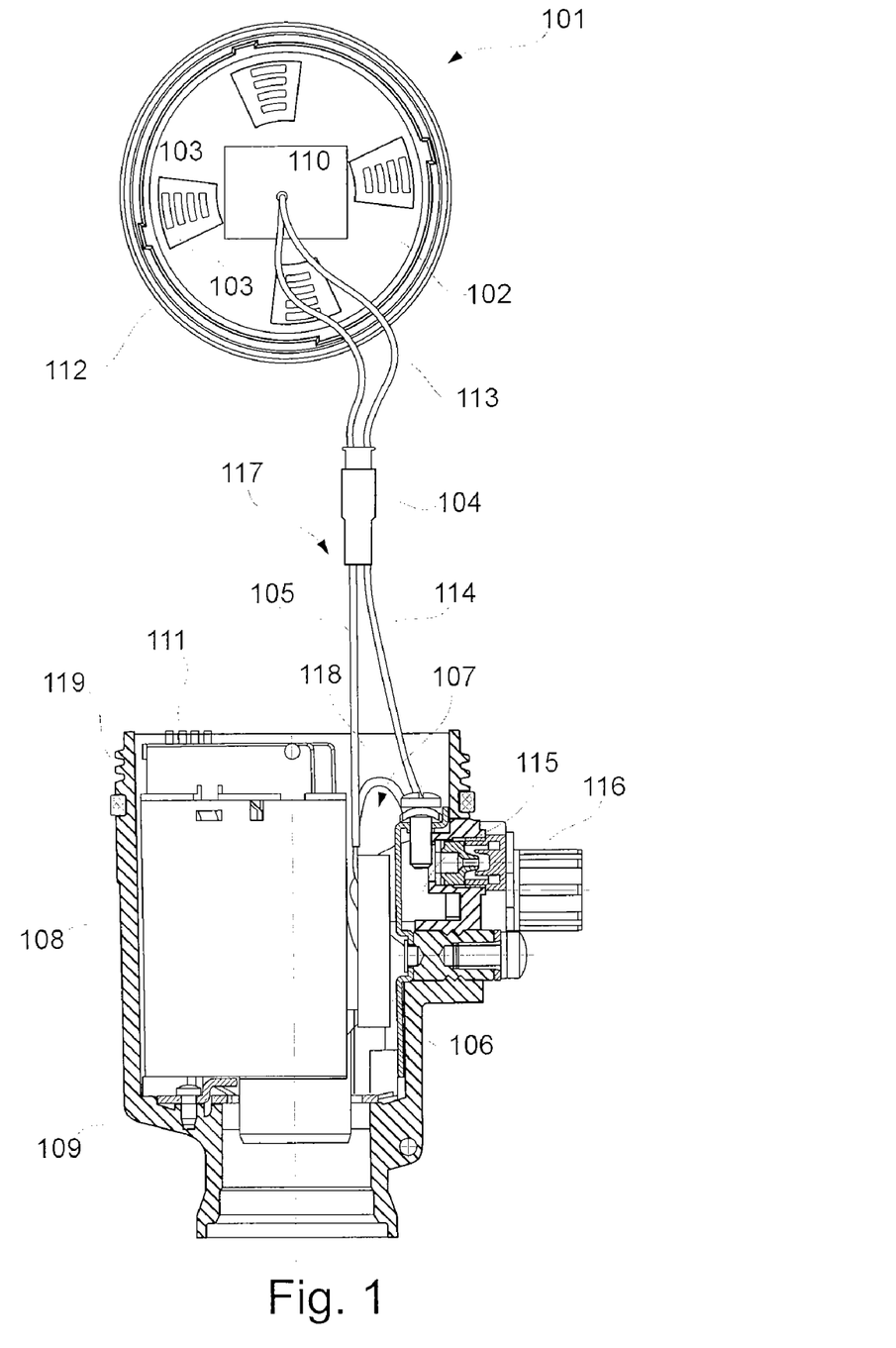
FIG. 1 shows a field device with a field device display and a heating-element control device according to an exemplary embodiment of the present invention.

FIG. 1 shows a field device with a field device display and a heating-element control device according to an exemplary embodiment of the present invention. The field device display 101 is shown in a rear view with a built-in heating element (not visible in FIG. 1). The field device display 101 comprises the housing 112, and the rearward termination 102 of the display 101 comprises the signal connections 103. The signal connections 103 can contact the spring contacts 111. Also the leadthrough 110 is visible, which is also arranged on the rearward termination 102. Furthermore, the connection lines 113 are visible, via which the energy for the heating element is provided.

The field device display 101 comprises the display housing 112, the rearward termination 102 of the housing, and the field-device display module (not shown in FIG. 1).

By the connector 104 a connection of the connection lines 103 to the connection line 105 and the connection line 114 takes place. The connection line 105 leads to the heating-element control device 106 or the thermostat 106, which is arranged as an add-on module 106 on the electronics insert 108.

The connection line 114 does not lead directly to the heating-element control device 106. The connection line 114 leads to the EMC filter 115, which is arranged in the M12 socket 116 of the field device housing. Current is supplied to the heating arrangement 117 via the M12 socket 116. However, before the current reaches the heating-element control device 106 it passes through the EMC filter and is freed of interferences.

The current reaches the thermostat 106 via the connection line 118, which connects the EMC filter to the thermostat 106.

The thermostat 106 is arranged in an interspace 107 between the electronics insert 108 and the measuring device housing 109. In the electronics insert 108 the functions typical of the field device are implemented. The heating arrangement provides an additional function in addition to the measuring functions, which additional function can partly be accommodated in the additional module 106.

The field device 101 can be snapped onto the measuring device housing 109 by a bayonet closing 119 so that the contact surfaces 103 establish contact with the spring contacts 111. Thereby an information transfer, for example a measured value or the information about a measured value which measured value is to be displayed, can be effected between the electronics insert 108 and the display 101. The presentation of a measured value takes place independently of the heating of the display.

Figure 2:
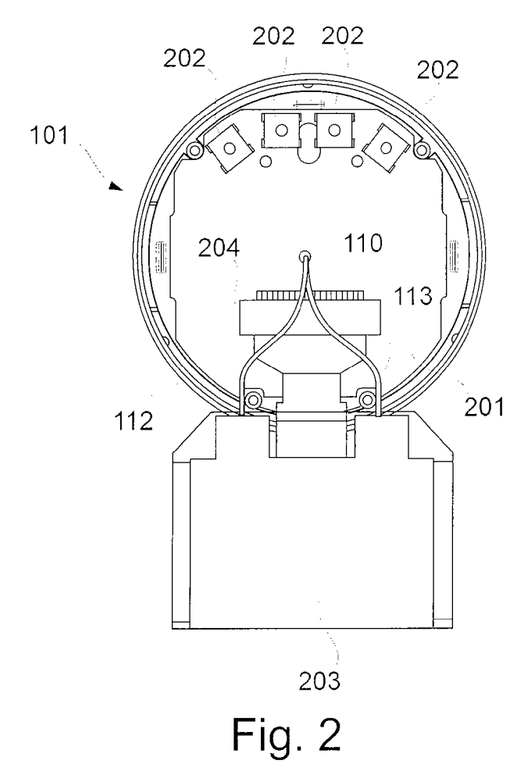
FIG. 2 shows a top view of a field device display with a heating element in a folded-open state according to an exemplary embodiment of the present invention.

FIG. 2 shows a top view of a display with a heating element in a folded-open state according to an exemplary embodiment of the present invention. The housing 112 of the field device display 101 has a round shape. The display circuit board 201 is adapted to the round shape of the display housing 101 and comprises the four input devices 202 for the input of user information. By these input devices the heating arrangement can be switched on and off.

Via the hole 110 in the circuit board 201 the connection lines 113 emerge, which connection lines 113 supply the heating element 203 with current for the heat generation.

Furthermore, the circuit board 201 comprises a connector plug 204, by which the field-device display module (not drawn in FIG. 2), for example an LCD display, is connected to the circuit board 201. In FIG. 2 the connector plug 204 is shown as a flexible connector 204.

Figure 3:
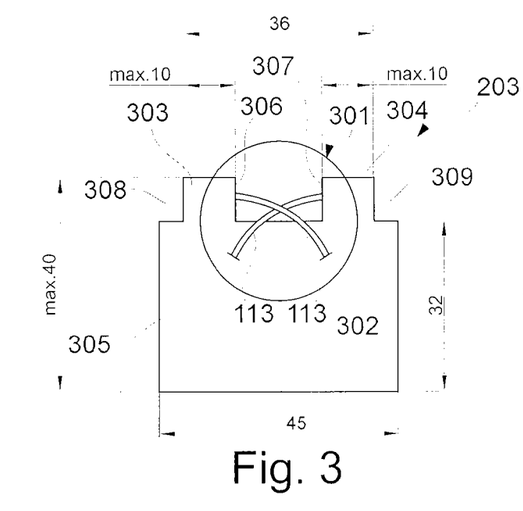
FIG. 3 shows a top view of a heating element according to an exemplary embodiment of the present invention.

FIG. 3 shows a top view of a heating element according to an exemplary embodiment of the present invention. The heating element 203 has a substantially rectangular shape. In the terminal region 301, symmetrical in relation to the symmetry axis 302, the two terminal 303 and 304 are provided.

With reference to FIG. 3, the connectors 303 and 304 are arranged at the top side of the rectangular basic body 305. The terminal 303 and 304 form peg-shaped extensions at the top side of the rectangular basic body 305.

The terminal regions 303 and 304 also have a rectangular shape. The heating element 203 thus is assembled by three rectangular shapes, the rectangular basic body 305, the terminal 303, and the terminal 304.

In FIG. 3 the heating element 203 comprises a left side, a right side, a top and a bottom side. The sides which are shown on the left and on the right in the figure are shorter than the sides that are shown on the top and on the bottom in FIG. 3. The top side and the bottom side are 45 mm in length. The length of the left side and the right side is 32 mm.

The terminal 303 comprises an interior side 306 or face, and the terminal 304 comprises an interior side 307 or face. The interior side 306 of the terminal 303 faces the interior side 307. The connection lines 113 are connected to the interior side 306 and to the interior side 307.

The exterior side 308 of the terminal 303, and the exterior side 309 of the terminal 304 have a distance of 36 mm. The interior side 306 and the exterior side 308 have a distance of 10 mm max., i.e. the thickness of the attachment 303 is 10 mm. Likewise, the interior side 307 and the exterior side 309 have a distance of 10 mm max., i.e. the thickness of the attachment 304 is 10 mm.

The rectangular basic body 305 comprises two long sides and two short sides. The overall length of the length of a short side of the rectangular basic body 305 plus the length of the side 308 or 309 is max. 40 mm.

Figure 4:
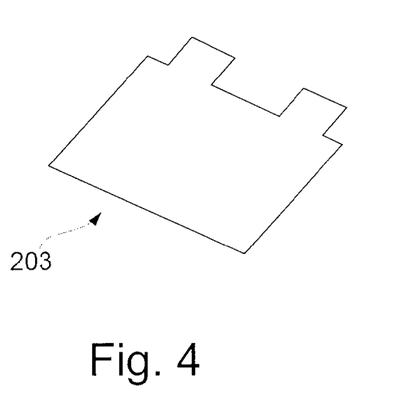
FIG. 4 shows a perspective view of a heating element according to an exemplary embodiment of the present invention.
Figure 5:
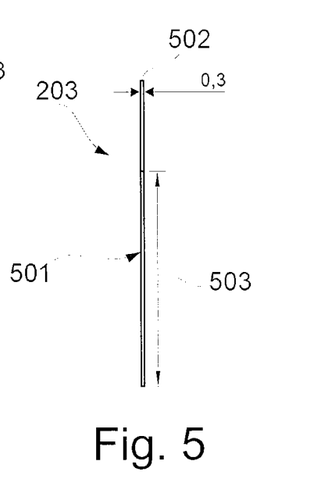
FIG. 5 shows a lateral view of a heating element according to an exemplary embodiment of the present invention.

The foil character of the heating element can be seen in the perspective view of the heating element 203 in FIG. 4, and in the lateral view of the heating element 203 in FIG. 5. The longitudinal extension 503 of the heating foil 203 is significantly larger than the thickness 502 of the heating foil 203. The heating foil 203 in FIG. 5 comprises an adhesive side 501, by which the heating foil can be glued to a field-device display module.

Figure 6:
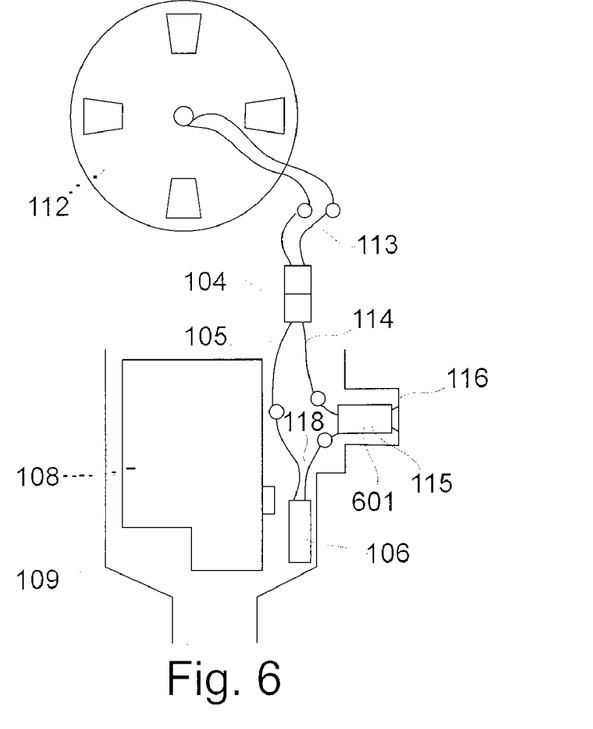
FIG. 6 shows a heating arrangement in a field device housing according to an exemplary embodiment of the present invention.

FIG. 6 shows a heating arrangement in a field device housing according to an exemplary embodiment of the present invention. The FIG. 6 diagrammatically shows the arrangement of the heating arrangement 117 in the field device housing 109 or in the sensor housing 109.

The sensor housing 109 comprises an M12 socket 116. In this M12 socket 116 the EMC filter 115 with the ground shield 601 is arranged. To prevent interferences, the sensor housing is made of aluminium. The aluminium housing 109 acts as a ground shield, which substantially keeps interfering radiation away from the housing.

Figure 7:
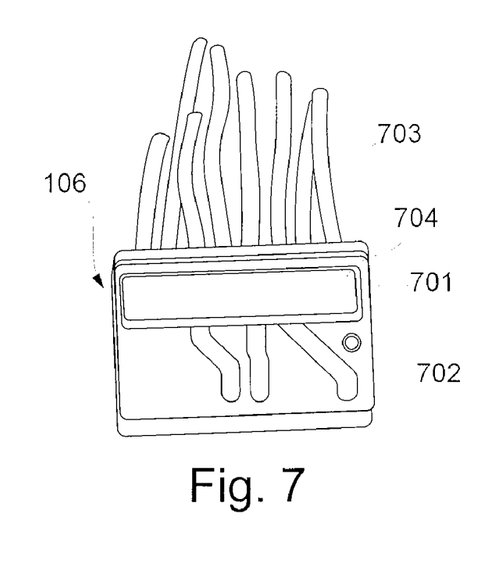
FIG. 7 shows a front view of a cast component according to an exemplary embodiment of the present invention.

FIG. 7 shows a front view of a cast component according to an exemplary embodiment of the present invention. The cast block 701 encloses the assembly 702, on which the conductor paths and electronic components are arranged. The cast block 701 is made from resin or plastic. With a corresponding mould, during moulding and curing of the cast block 701, an external structure, such as the guide rail 704, can be formed.

The connection lines 703 contact the assembly 702 and provide an interface between the assembly 702 and external other assemblies. The assembly 702 carries out the electrical function of the cast component 106. The cast component 106 shown in FIG. 7 is the thermostat 106 of a heating arrangement, or the heating-element control device 106. For the reception of the temperature, the heating-element control device 106 can also be connected to an external temperature measuring device (not shown in FIG. 7).

Figure 8:
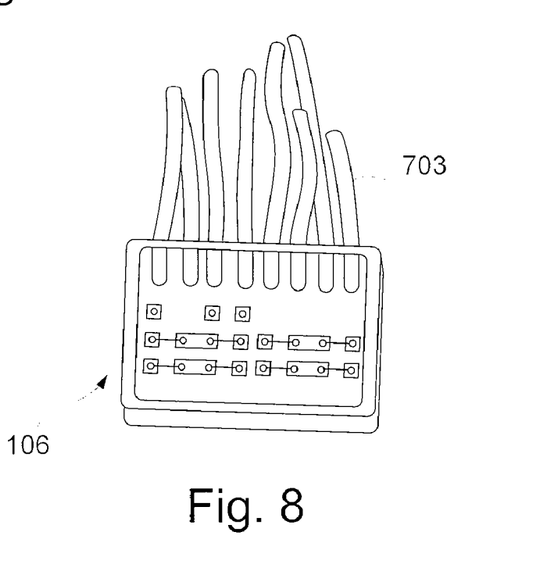
FIG. 8 shows a rear view of a cast component according to an exemplary embodiment of the present invention.

FIG. 8 shows a rear view of a cast component according to an exemplary embodiment of the present invention.

Figure 9:
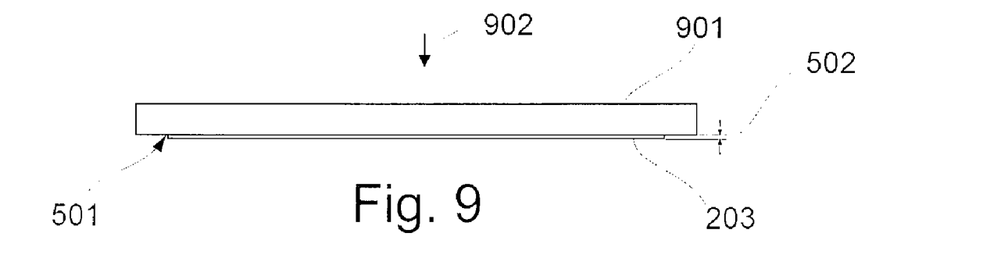
FIG. 9 shows a sectional view through a field-device display module with a heating element according to an exemplary embodiment.

FIG. 9 shows a section view through a field-device display module with a heating element according to an exemplary embodiment. The FIG. 9 shows the direction of reading 902, in which the reading off of the field-device display module 901 happens.

The heating foil 203 is shown behind the field-device display module 901, when viewed in the direction of reading 902 or direction of view 902. The heating foil 203 is arranged by their adhesive side 56 on the side of the field-device display module, which side faces away from the direction of view 902.

Both the cross section of the field-device display module 901 and the cross section of the heating foil are rectangular in shape. The longitudinal side of the cross section of the field-device display module 901, which side is attached by the adhesive side 501, and the longitudinal side of the cross section of the heating foil 203 have a different length. The length of the longitudinal side of the heating foil 203 is shorter than the length of the longitudinal side of the field-device display module 901.

The height of the field-device display module 901, which height extends at a right angle in relation to the longitudinal side, and the height 502 of the heating foil 203, which height extends at a right angle in relation to the longitudinal side, differ in height. The height 502 of the heating foil 203 is less than the height of the field-device display module 901.

Figure 10:
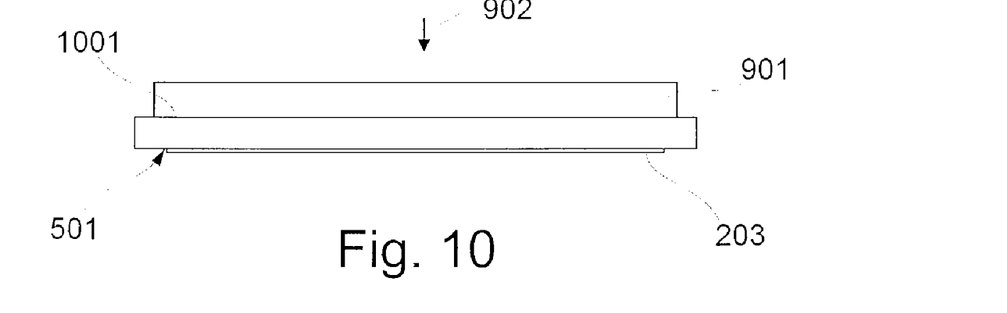
FIG. 10 shows a sectional view through a field-device display module with an illumination device and a heating element.

FIG. 10 shows a section view of a field-device display module with an illumination device and a heating element. In contrast to FIG. 9, in FIG. 10 the heating foil 203 is not directly glued to the underside facing away from the direction of view 902. However, the illumination device 1001 is arranged between the field-device display module 901 and the heating foil 203. The heating foil 203 is therefore coupled to the rear side of the illumination device 1001.

Consequently, by the heating foil a warming of the illumination device 1001 and at the same time a warming of the field-device display module 901 can be achieved. At the same time, a waste heat generated by the illumination device 1001 can be used to warm the field-device display module.

The section through the illumination device 1001 is also rectangular in shape. However, the longitudinal side of the illumination device 1001 is longer than the longitudinal side of the field-device display module 901. Thus, the illumination device 1001 projects on both sides beyond the field-device display module.

Figure 11:
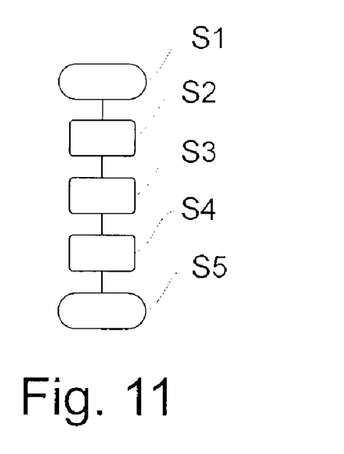
FIG. 11 shows a flow chart of a method for displaying a measured value on a field-device display module according to an exemplary embodiment of the present invention.

FIG. 11 shows a flow chart of a method for displaying a measured value on a field-device display module according to an exemplary embodiment of the present invention. It shows the initial state S1, in which the heating arrangement is switched off. The field-device display module, too, can be switched off in this state. The energy that is not used in this state can be transmitted to another consumer. In particular, with this energy a capacitor or energy storage device can be charged in order to have energy available for the heating during reading off.

In step S2 the switching on of the heating arrangement is carried out, whereby the display can be heated in step S3. By the heating, frozen liquid crystals can become movable, and a displaying of measured values can occur even at low temperatures, at which temperatures a displaying could otherwise not be carried out.

The displaying finally takes place in step S4. The display can be switched off either by a switch or by an elapsed timing element so that in step S5 the switched-off state exists again.

Figure 12:
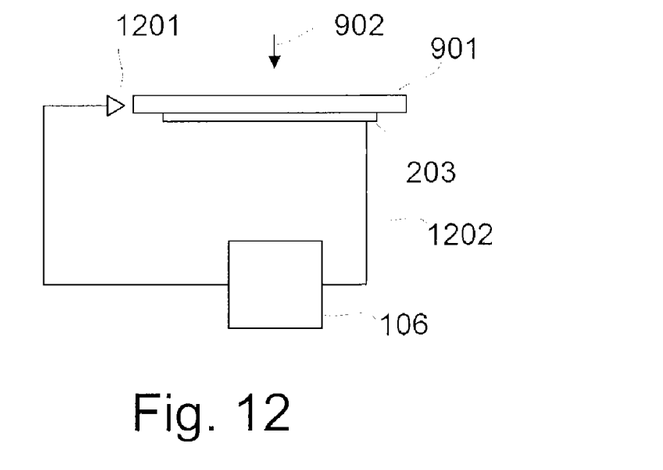
FIG. 12 shows a closed loop of a heating arrangement according to an exemplary embodiment of the present invention.

FIG. 12 shows a closed loop of a heating arrangement according to an exemplary embodiment of the present invention. By the temperature measuring device 1201, which is arranged on the field-device display module 901, the temperature of the field-device display module 901 is measured. The measured value is transmitted to the heating-element control device 106, in which it is determined whether more thermal energy is to be supplied to the field-device display module 901.

In the connection line 1202 a current is provided by the heating-element control device 106 which current in the heating foil 203 is converted to thermal energy. The heating foil 203 is coupled below the field-device display module 901. By the generated thermal energy the field device display 901 is heated until the heating-element control device 106 detects that a previously set desired temperature has been reached. The desired temperature relates to a temperature at which the field-device display module, in particular, a displayed measured value can be read-off. After the desired temperature has been reached, the energy supply to the heating foil is stopped.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

What is claimed is:

1. A heating device for a field-device display module, field-device display module suitable to display measurement data in relation to a production process, the heating device comprising:

a heating element adapted to a shape of the field-device display module, the heating element converting an electrical current to a thermal energy;

a first line system supplying the electrical current to the heating device, wherein the heating element is couplable to the field-device display module so that, by the heating element, the field-device display module is heatable, and wherein the first line system is arranged as a measuring-bus line system to transfer the measurement data for display at the field-device display module.

2. The heating device of claim 1, wherein the heating element is couplable to the field-device display module so that, by the heating element, the field-device display module is heatable by a thermal conduction.

3. The heating device of claim 1, wherein the heating element is couplable to the field-device display module so that, by the heating element, the field-device display module is heatable by a thermal radiation.

4. The heating device of claim 1, wherein the heating element is a heating foil.

5. The heating device of claim 4, wherein the heating foil includes an adhesive side, the heating foil is coupled to the field device display with the adhesive side.

6. The heating device of claim 1, wherein the heating element further includes an illumination device, the illumination device being attachable between the field-device display module and the heating device.

7. The heating device of claim 1, wherein the heating element is substantially transparent.

8. The heating arrangement of claim 1, wherein the first line system includes an ElectroMagnetic Compatability filter.

9. The heating arrangement of claim 1, wherein the measuring-bus line system is a system selected from a group consisting of 2-wire bus system, Profibus bus system and Fieldbus foundation bus system.

10. A heating arrangement for a field-device display module, field-device display module suitable to display measurement data in relation to a production process, the heating arrangement comprising:
a heating device including a heating element adapted to a shape of the field-device display module, the heating element converting an electrical current to a thermal energy, the heating element being couplable to the field-device display module so that, by the heating element, the field-device display module is heatable;
a heating-element control device controlling the electrical current for the heating element so that a specifiable thermal energy is supplyable to the field-device display module; and
a first line system supplying the electrical current to the heating arrangement, wherein the first line system is arranged as a measuring-bus line system to transfer the measurement data for display at the field-device display module.

11. The heating arrangement of claim 10, further comprising:
a temperature measuring device measuring an ambient temperature, the heating-element control device, in exceed of a specifiable ambient temperature, supplying a constant current to the heating element.

12. The heating arrangement of claim 10, further comprising:
a temperature measuring device measuring an ambient temperature, the heating-element control device controlling the electrical current for the heating element so that, depending on the measured ambient temperature, a thermal energy is supplyable to the field-device display module.

13. The heating arrangement of claim 10, further comprising:
a temperature measuring device coupled to the field-device display module to measure a field-device display temperature;
wherein the heating-element control device keeps the field-device display temperature of the field-device display module constant.

14. The heating arrangement of claim 10, further comprising:
a field device housing includes a hollow space;
wherein the heating element control device is situated in the hollow space.

15. The heating arrangement of claim 14, wherein the field device housing is at least partly made from aluminium.

16. The heating arrangement of claim 10, wherein the heating-element control device is formed as a cast component.

17. The heating arrangement of claim 10, further comprising:
an energy storage.

18. A measuring device, comprising:
a heating arrangement including (a) a heating device which has a heating element, wherein the heating device is adapted to fit a shape of a field-device display module, the field device display module suitable to display measurement data in relation to a production process, the heating element of the heating device is adapted to convert an electrical current to a thermal energy, the heating element being couplable to the field-device display module so that, by the heating element, the field-device display module is heatable; (b) a heating-element control device adapted to control the electrical current for the heating element so that a specifiable thermal energy is supplyable to the field-device display module and (c) a first line system supplying the electrical current to the heating arrangement, wherein the first line system is arranged as a measuring-bus line system to transfer the measurement data for display at the field-device display module.

19. The measuring device of claim 18, wherein the measuring device is selected from a group consisting of a fill-level measuring device and a pressure measuring device.

20. A method for displaying a measured value on a field-device display module, comprising:
switching on a heating arrangement;
supplying an electrical current via a first line system connectable to the field-device display module, the first line system being arranged as a measuring bus-line system;
using the supplied electrical current for heating the field-device display module;
supplying a measured value via the first line system; and
displaying the measured value.

* * * * *